United States Patent [19]

Stevens et al.

[11] 4,099,384
[45] Jul. 11, 1978

[54] INTEGRAL SEPARATOR START-UP SYSTEM FOR A VAPOR GENERATOR WITH CONSTANT PRESSURE FURNACE CIRCUITRY

[75] Inventors: William D. Stevens, North Caldwell; Walter P. Gorzegno, Morristown, both of N.J.

[73] Assignee: Foster Wheeler Energy Corporation, Livingston, N.J.

[21] Appl. No.: 713,313

[22] Filed: Aug. 10, 1976

Related U.S. Application Data

[63] Continuation-in-part of Ser. No. 538,236, Jan. 2, 1975, abandoned.

[51] Int. Cl.² .............................................. F01D 19/00
[52] U.S. Cl. ...................................... 60/657; 60/646; 122/406 S
[58] Field of Search ......................... 60/646, 656, 657; 122/406 S, 406 ST

[56] References Cited

U.S. PATENT DOCUMENTS

| | | | |
|---|---|---|---|
| 3,211,135 | 10/1965 | Grimes et al. ................. | 122/406 ST |
| 3,220,193 | 11/1965 | Strohmeyer ...................... | 60/646 X |
| 3,259,111 | 7/1966 | Koch .............................. | 122/406 ST |
| 3,262,431 | 7/1966 | Hanzalek ........................ | 122/406 ST |
| 3,366,093 | 1/1968 | Stevens et al. ................. | 122/406 ST |
| 3,370,573 | 2/1968 | Hanzalek et al. .............. | 122/406 ST |
| 3,612,005 | 10/1971 | Lytle ................................ | 122/406 S |
| 3,789,806 | 2/1974 | Gorzegno ....................... | 122/406 ST |

Primary Examiner—Allen M. Ostrager
Assistant Examiner—Stephen F. Husar
Attorney, Agent, or Firm—Marvin A. Naigur; John E. Wilson

[57] ABSTRACT

A vapor generating system for use in a power plant having a steam turbine and a condenser connected in a series flow relationship, in which a vapor generating section receives a heat exchange fluid and passes the fluid in a heat exchange relation to a source of heat to raise the temperature and pressure of the fluid to predetermined values. The vapor generating section operates at substantially constant pressure during start-up and a pressure control station is provided which includes one or more relatively small bore tubes, a first conduit having control means disposed therein, and a second conduit, through which fluid passes before it is passed to a plurality of separators in the main flow path which receives the fluid and separates same into a liquid and a vapor. The separators are connected to a vapor circuit and to a liquid circuit for passing the vapor and liquid to the turbine and heat recovery or condenser, respectively. A method of starting up a vapor generating system in a power plant.

9 Claims, 11 Drawing Figures

INTEGRAL SEPARATOR START-UP SYSTEM FOR A VAPOR GENERATOR WITH CONSTANT PRESSURE FURNACE CIRCUITRY

CROSS REFERENCE TO RELATED APPLICATION

This application is a continuation-in-part of copending application Ser. No. 538,236 filed Jan. 2, 1975 now abandoned.

BACKGROUND OF THE INVENTION

This invention relates to a start-up system for vapor generators and in particular to an apparatus and method for starting up a subcritical or supercritical, once-through vapor generator.

In general, a once-through vapor generator operates to circulate a pressurized fluid, usually water, through a vapor generating section and a superheating section to convert the water to vapor. In these arrangements, the water entering the unit makes a single pass through the circuitry and discharges through the superheating section outlet of the unit as superheated vapor for use in driving a turbine, or the like.

Although these arrangements provide several improvements over conventional drum-type boilers, some problems have arisen in connection with starting up the generators, usually stemming from fluid at an undesirable quantity or condition being passed to the components of the system, resulting in excessive thermal losses, as well as mismatching of the throttle steam to the turbine inlet causing a decrease in turbine component life.

Earlier attempts to solve some of these problems included arrangements providing bypass circuitry for a portion of the fluid at a point in the flow circuitry between the vapor generating and superheating sections and/or between the superheating section and the turbine during startup to precool a portion of the system yet avoid the possibility of fluid at an undesirable quantity or condition being passed to the turbine. However, these arrangements resulted in very poor heat recovery and, therefore, operated at a reduced thermal efficiency and, moreover, resulted in relatively unsuitable turbine throttle vapor conditions for rolling and bringing the turbine up to speed prior to loading.

Attempts to alleviate the latter problems included installing a division valve in the main flow path to divert flow to a bypass circuit including a flash tank separator located between the vapor generating section and the superheating section, or between a primary and finishing superheater in the superheating section. In these arrangements, the flash vapor from the separator is furnished to the superheating section or to the finishing superheater, and the drains from the separator are passed to a deaerator and/or high pressure heater and/or condenser. However, in these systems, the separator could often accommodate nly a limited pressure, which was considerably less than the full operating pressure of the main pressure parts. Therefore, after start up, when turbine demands approached pressures exceeding the design pressure of the separator, the separator had to be switched out of operation and flow to the turbine supplied directly from the main flow line upstream of the flash tank. However, this switch of flow often caused control difficulties and, in addition, caused a drop in enthalpy at the turbine since the flow source switched from a saturated vapor from the separator to a lower enthalpy water-vapor mixture from the main flow line. Therefore, in order to avoid pressure excursions and an uncontrolled significant temperature drop at the turbine throttle, the valve controlling flow to the turbine directly from the main flow line had to be opened very slowly, the firing rate had to be increased, and the separator outlet valve closed to slowly transfer the source of turbine steam from the separator to the main flow line. This, of course, resulted in a considerable expenditure of time and energy, and a considerable sophistication of controls.

Also, in these latter arrangements, when vapor formed in the separator in response to a start-up firing rate input, the vapor, in addition to flowing to the turbine, was routed to other areas of the system such as high-pressure heaters and/or the condenser until a percentage of the final turbine load was achieved. Therefore, these arrangements required the use and operation of several valves which added to the labor and costs in the operation of the system.

Although it has been suggested to provide a separator directly in the main flow line, these arrangements have proven to be costly due to the fact that a relatively large, thick-walled separator, and associated components, have to be used. Also, the vapor initially forming in the separator is passed in a circuit bypassing the finishing superheater and the turbine during start up, after which the flow is switched to the superheater and turbine, which also requires a control system utilizing a number of valves.

SUMMARY OF THE INVENTION

It is, therefore, an object of the present invention to provide a vapor generating system and method incorporating a start-up system which does not require the use of bypass circuitry incorporating a flash tank.

It is a further object of the present invention to provide a system and method of the above type in which a plurality of separators are utilized which together operate in a manner to permit the turbine to be smoothly loaded at pressures and temperatures that constantly and gradually increase.

It is a still further object of the present invention to provide a system and method of the above type in which a pressure reducing station, including at least one small bore tube, and a first conduit having control means disposed therein is located upstream of the separators to supply the fluid to the separators at a pressure permitting the liquid portion of the fluid to be separated from the vapor portion.

It is still a further object of the present invention to provide a system and method of the above type in which a pressure reducing station, including at least one small bore tube, a first conduit having control means disposed therein and a second conduit, the tube and conduits operating in a parallel flow relationship, is located upstream of the separators to supply the fluid to the separators when a predetermined rate of fluid flow through the vapor generating section is attained.

It is a still further object of the present invention to provide a system and method of the above type in which the aforementioned pressure reduction station includes at least one small bore tube for controlling the pressure of the cold fluid during start up without the need for valves or the like.

It is a still further object of the present invention to provide a system and method of the above type in which vapor initially forming in the separators is immediately passed in the main vapor circuit containing the superheater section and the turbine, to eliminate the controls and valves required to initially route the vapor elsewhere.

Toward the fulfillment of these and other objects, the system of the present invention comprises a vapor generating section adapted to receive a heat exchange fluid and pass the fluid in a heat exchange relation to a source of heat to raise the temperature of the fluid to predetermined values. One or more relatively small bore tubes are connected to the outlet of the vapor generating section for receiving the fluid and reducing the pressure thereof. A first conduit for receiving fluid from the vapor generating section having control means disposed therein is connected in parallel flow relationship to the small bore tube for maintaining the pressure of the fluid in the vapor generating section at a predetermined level. A second conduit for receiving fluid from the vapor generating section is connected in parallel flow relationship to the small bore tube and first conduit for passing fluid to the separator when the flow rate of the fluid in the vapor generating section reaches a predetermined rate. A plurality of separators are connected to the tubes and conduits and are adapted to separate the fluid into a liquid and a vapor. Vapor circuit means connect the separators to the turbine for passing all of the vapor formed in the separators to the turbine.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention when taken in connection with the accompanying drawings, wherein.

DESCRIPTION OF THE PREFERRED EMBODIMENTS

Figure 1:
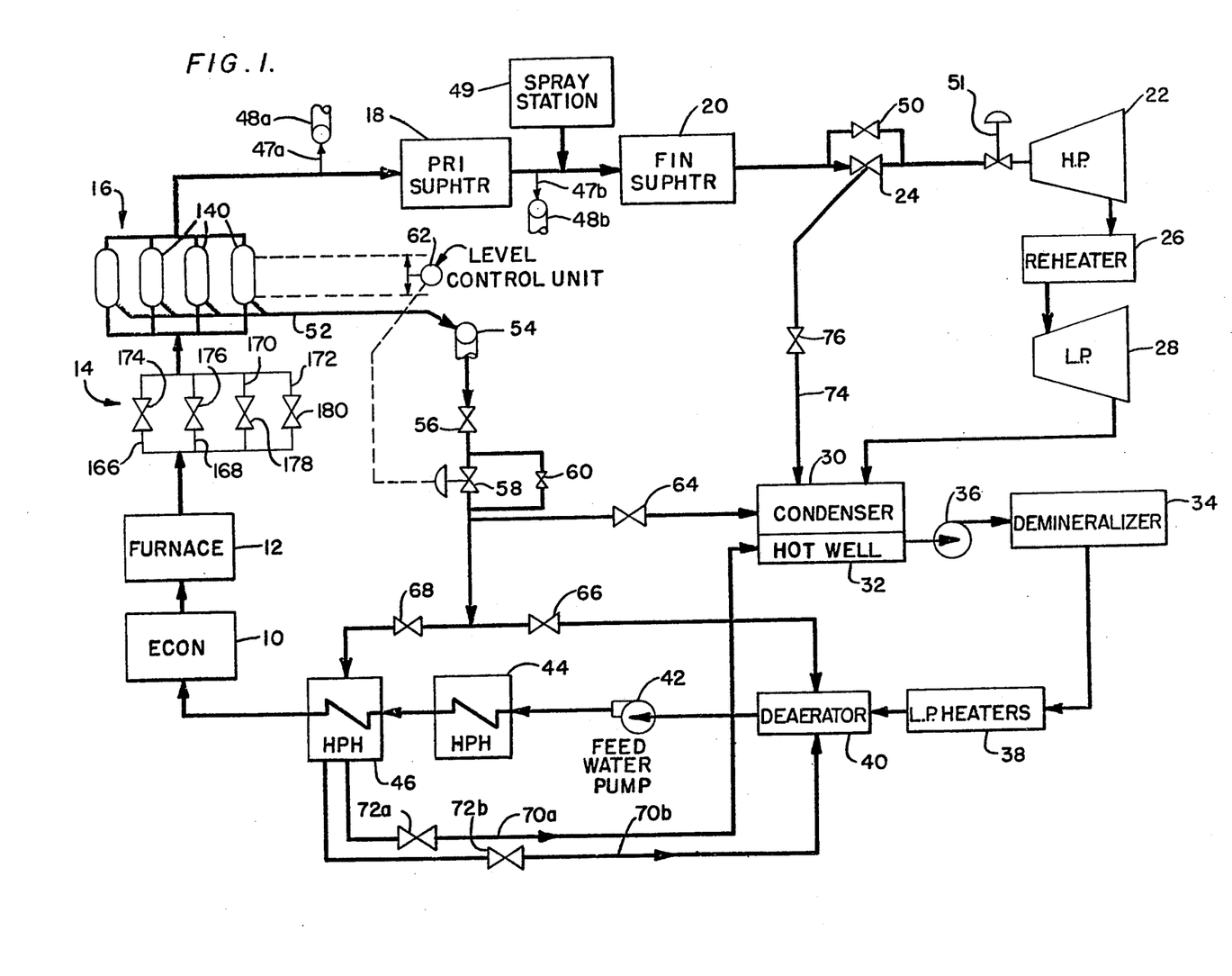
FIG. 1 is a schematic representation of a power plant incorporating the system of the present invention.

Referring to FIG. 1 of the drawings, there is depicted the main fluid circuit of the system of the present invention, which includes an economizer 10 which receives a heat exchange fluid, such as water, and transfers same to a furnace section 12 which is adapted to convert the water to steam in a manner to be described. A pressure reducing station 14 is located downstream from the furnace section 12, and a separating station 16 is in direct flow connection with the outlet of the pressure reducing station. A primary superheater 18 is located downstream of the separating station 16, and, in turn, is connected to a finishing superheater 20. A high pressure turbine 22 receives fluid from the finishing superheater 20 after it passes through a stop valve 24, and the exhaust flow from the high pressure turbine 22 is reheated in a reheater 26 before being transmitted to a low pressure turbine 28. The economizer 10, the furnace section 12, the superheaters 18 and 20, and the reheater 26 are all part of a vapor generating section which will be described in detail later.

Also included in the main flow path is a condenser 30 which receives the exhaust flow from the low pressure turbine 28 and which includes a hotwell 32. Between the hotwell 32 and the economizer 10, the main flow path includes a demineralizer 34 which receives the condensate from the hotwell 32 under the force of a pump 36, a series of low pressure heaters, shown in general by the reference numeral 38, and a deaerator 40 which transmits the flow to a feedwater pump 42. The water is pressurized in the feedwater pump 42 and transmitted to the tube sides of two high pressure heaters 44 and 46, and from there back to the economizer 10 to complete the main flow circuit.

It is understood that the connections between the above-mentioned sections in the main flow circuit which are shown schematically in the drawings are achieved by fluid circuitry in the form of conduits, tubes, risers, headers, etc., to transfer the heat exchange fluid throughout the various sections.

Other components associated with the main flow circuit include a pair of auxiliary steam lines 47a and 47b connected in the main flow circuit immediately upstream and downstream, respectively, of the primary superheater 18 and connected to headers 48a and 48b, respectively. The headers 48a and 48b can be connected to one or more of several components in the system, such as the deaerator 40, the heaters 38, 44, 46, and the seals and/or the feed pumps of the turbines 22 and 28, to supply steam from the main flow circuit to their components. It is understood that suitable valving can be disposed in the lines 47a and 47b to control the flow of the steam from the main flow circuit to the headers 48a and 48b, respectively.

Other associated components include a spray station 49 located in the circuit between the primary superheater 18 and the finishing superheater 20, and a turbine stop valve bypass 50 connected in parallel with the turbine stop valve 24 between the finishing superheater 20 and the high pressure turbine 22, and a turbine control valve 51 located immediately upstream of the high pressure turbine 22.

The separating station 16 includes a plurality of separators which will be described in detail later and which operate to receive a mixture of vapor and water and separate the vapor from the water. In this context, a water flow circuit, including a drain line 52, connects the water outlets of each of the separators to a drain collecting header 54 from which the water passes through an isolating valve 56 and to control valves 58 and 60 arranged in parallel. A level control unit 62 is responsive to level changes in the separators in a manner to be described, for controlling the operation of the control valves 58 and 60 to maintain predetermined water levels in the separators. Valves 64, 66, and 68 are disposed in the above-mentioned water flow circuit to selectively direct the water from the control valves 58 and 60 to the condenser 30, the deaerator 40, and to the high pressure heater 46, respectively.

Other ancillary fluid flow circuits include lines 70a and 70b connecting the output of the high pressure heater 46 to the hotwell 32 and the deaerator 40, respectively, under the control of valves 72a and 72b, respectively; and a line 74 connecting the generator side of the stop valve 24 to the condenser 30 under the control of a valve 76 for the purposes of providing a drain for the main fluid circuit to the condenser 30.

Figure 2:
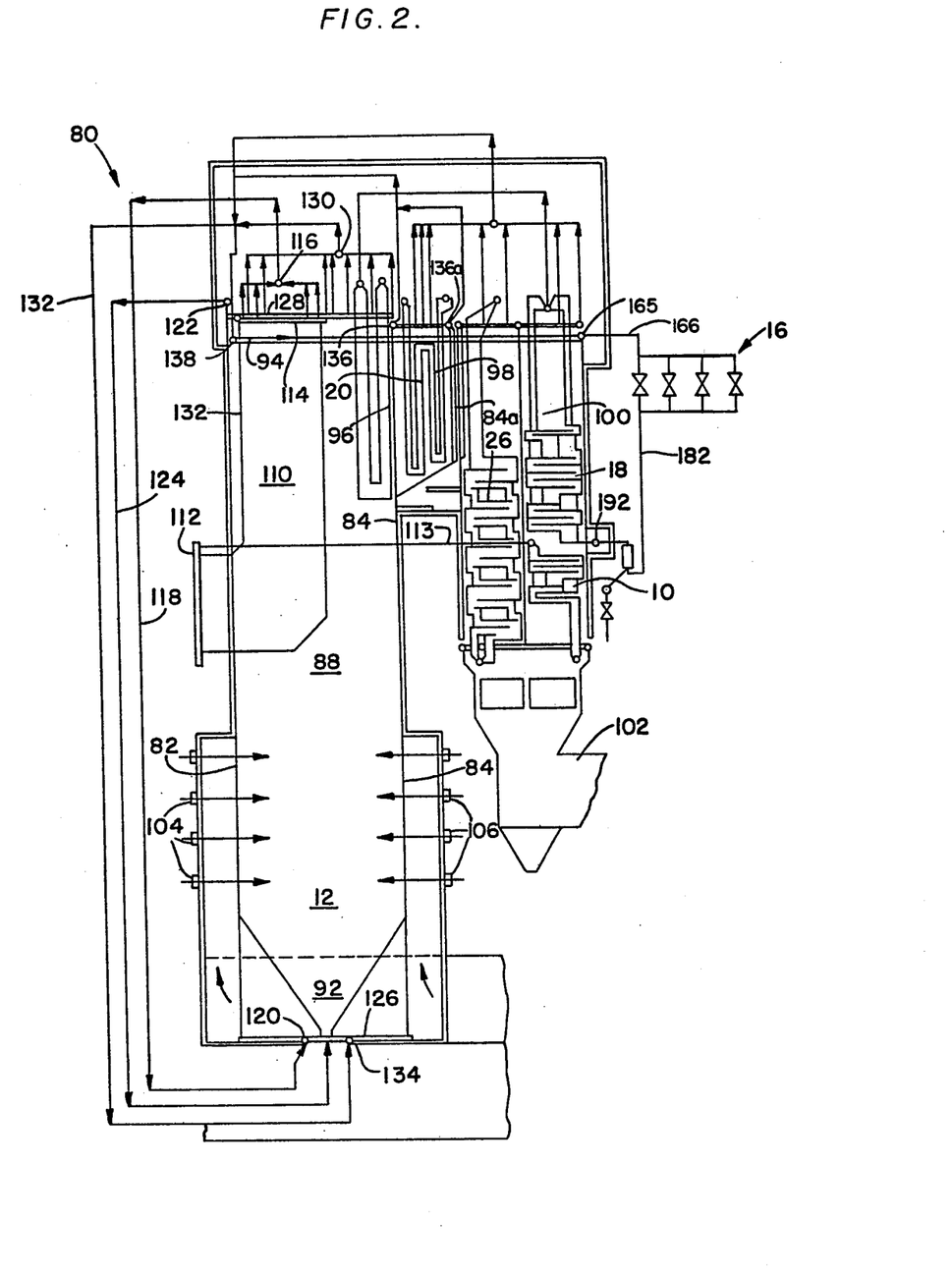
FIG. 2 is a partial sectional, partial schematic view of the vapor generating section of the system of the present invention.

Reference is now made to FIG. 2 which depicts the above-mentioned vapor generating section of the present invention which includes several of the above-mentioned components in greater detail. In particular, the vapor generating section is referred to in general by the reference numeral 80 and includes the furnace section 12 which is formed by front and rear walls 82 and 84, respectively, and a pair of sidewalls 88 (one of which is shown in FIG. 2) which extend between the front and rear walls to define an enclosure. The lower portions of the front wall 82 and the rear wall 84 are sloped inwardly to form a hopper section 92. It is understood that each of the walls 82, 84, and 88 are made up of a plurality of vertically extending tubes having continuous fins extending outwardly from diametrically opposed portions thereof, with the fins of adjacent tubes being connected together to form an airtight structure.

The front wall 82 and both sidewalls 88 form continuous panels extending vertically from the hopper portion 92 to a roof 94 which is also formed of a plurality of tubes arranged in the above manner. The upper portion of the rear wall 84 is configured in a manner to be described later so as to define a plurality of openings which, together with the roof 94, define a gas exit 96 which leads to a vestibule 98 in gas flow communication with a downwardly extending convection zone 100 having an outlet 102. The vestibule 98 and the convection zone 100 house the economizer 10, the primary superheater 18, the finishing superheater 20, and the reheater 26, all of which are in the form of a plurality of tubes adapted to receive the heat exchange fluid.

A plurality of burners 104 and 106 are disposed in the front and rear walls 82 and 84, respectively, immediately above the hopper section 92, with the burners being arranged in several vertical rows of four burners per row.

As a result of the above, the flow of gases in the vapor generating section is upwardly through the furnace section 12 and through the gas exit 96 into the vestibule 98 and downwardly in the convection zone 100 to the outlet 102. It is understood that an air heater (not shown) is connected to the outlet 102 for effecting a heat exchange between the hot exhaust gases and incoming air for the burners in a conventional manner.

Figure 3:
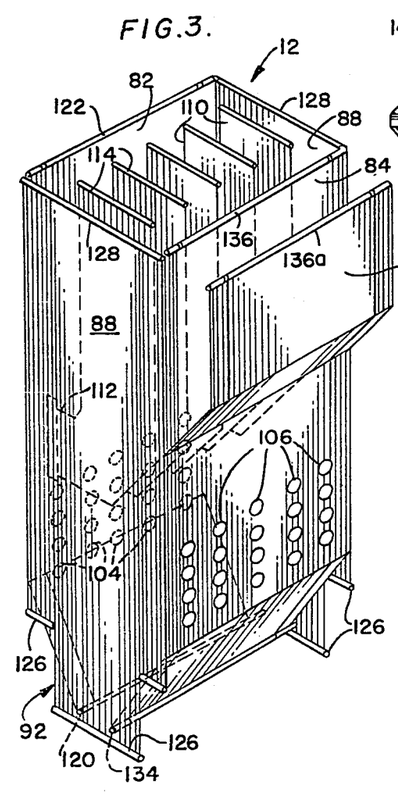
FIG. 3 is a schematic perspective view illustrating the furnace circuit used in the system of the present invention.

The details of the particular arrangement of the furnace section 12 are better depicted in FIG. 3. In particular, the upper portion of the rear wall 84 has a branch portion 84a which is formed by bending a selected number of tubes from the upper portion of the rear wall 84 to provide adequate spacing between some of the tubes in both of the walls 84 and 84a to define the exit 96 and permit the gases to pass from the vestibule portion 98 into the convection zone 100. A plurality of spaced parallel division walls 110 extend within the upper portion of the furnace enclosure with their lower portions being bent to penetrate the front wall 82 at a location above the burners 104, with the penetrating end portions of the division walls being connected to an inlet header 112.

The fluid flow circuit through the vapor generating section will be described in connection with FIGS. 2 and 3. In particular, feedwater from an external source (not shown) is passed to the tubes of the economizer 10 where it is heated by the gases passing over the latter tubes before exiting from the outlet 102. The heated feedwater from the economizer 10 is then passed via a line 113 (FIG. 2) to the inlet header 112 of the division walls 110 where it flows upwardly through the tubes of the walls to a plurality of outlet headers 114, and, via a header 116 and a downcomer 118 to an inlet header 120 which is in registry with the lower ends of the tubes of the front wall 82, as shown in FIGS. 2 and 3. An outlet header 122 is in registry with the upper ends of the tubes of the wall 82 for receiving the water after it passes through the latter wall. A downcomer 124 connects the outlet header 122 to inlet headers 126 which register with the lower ends of the tubes of both sidewalls 88 with the downcomer being branched to provide equal flow to both inlet headers. The fluid flow is thus transmitted upwardly through both sidewalls 88 where it is collected in headers 128 registering with the upper ends of the tubes of the latter walls. The fluid is then transferred, via a header 130 and a downcomer 132 to an inlet header 134 registering with the lower ends of the tubes of the rear wall 84. The fluid then flows upwardly through the tubes of both the rear wall 84 and the branch wall 84a in a parallel fashion before it is respectively passed, via outlet headers 136 and 136a, respectively, to an inlet header 138 connected to the tubes forming the roof 94, for further treatment that will be described later.

As a result of the foregoing, the water flows upwardly through the walls of the furnace 12 in essentially four vertically oriented flow passes connected in series - a first pass through the division walls 110, a second pass through the front wall 82, a third pass through the sidewalls 88, and a fourth pass through the rear wall 84. As a result of this type of multipass flow, the furnace operates at constant pressure during start up, as will be described in detail later.

Figure 4:
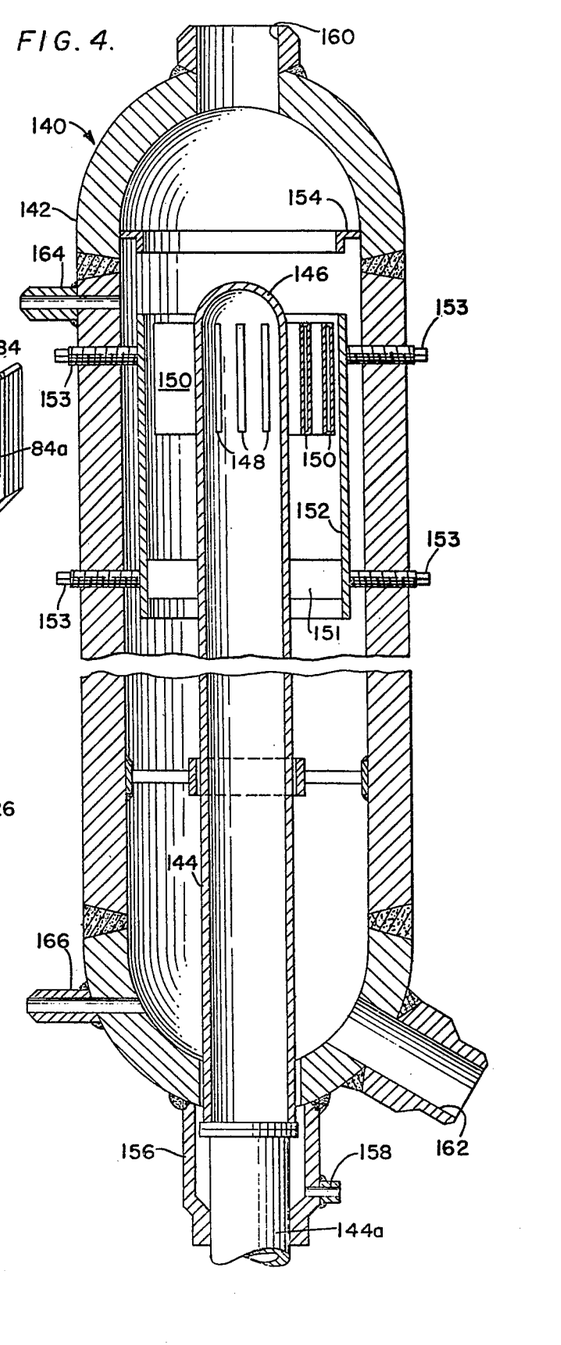
FIG. 4 is a vertical cross-sectional view of a separator used in the system of the present invention.

FIG. 4 depicts, in detail, one of the separators used in the separating station 16 in the main flow circuit. The separator is referred to in general by the reference numeral 140 and includes an upright cylindrical shell 142 through which a riser pipe 144 extends in a coaxial relationship. The riser pipe 144 has an end portion 144a extending from the lower end of the shell 142 which is adapted for receiving fluid from the pressure reducing station 14. A cap 146 extends over the upper end of the pipe 144 and a plurality of slots 148 are formed through the upper wall portion of the pipe near the latter end. A plurality of substantially spiral-shaped arms 150 are connected to the pipe 144 in registry with the slots 148 with the free ends of the arms being open to permit fluid to discharge therefrom.

A cylindrical, open-ended, skirt 152 extends within the shell 142 and around the upper portion of the riser pipe 144 in a coaxial relationship therewith, with the inner wall of the skirt being spaced a small distance from the free ends of the arms 150. The skirt 152 is supported relative to the shell 142 in the position shown by spacers 151 and a plurality of set screws 153 extending through the shell and engaging the skirt.

A drip ring 154 is disposed in the upper portion of the shell 142 above the arms 150, and a cup-shaped thermal sleeve 156 extends over the lower end portion 144a of the riser pipe 144 to define an annular passage in communication with an auxiliary drain 158.

A vapor outlet nozzle 160 is provided at the upper end portion of the shell 142 and a radially extending drain water outlet 162 is provided near the lower end portion of the shell. Also, the shell 142 is provided with a high level connection 164 and a low level connection 166 disposed near the upper and lower end portions of the shell, respectively, for the purpose of maintaining predetermined water levels in the shell 142, as will be described later.

As a result of the above, when the fluid entering the end portion 144a of the riser pipe 144 from the pressure reducing station 14 is in the form of a vapor-water mixture, it passes upwardly in the riser pipe and then radially outwardly from the pipe through the slots 148 and into the arms 150 where it will be directed tangentially against the inner wall of the skirt 152. This creates a vortex, or whirling stream, of fluid with the resulting centrifugal forces causing the vapor portion of the fluid to travel away from the inner wall of the skirt 152 and towards the center of the whirling stream, and pass upwardly by virtue of its buoyance into the upper portion of the shell 142, from which it exits, via the outlet 160. The liquid, or water, portion of the mixture in the whirling stream collects on and flows down the inner wall of the skirt 152 until it falls off the wall, collects in the lower end of the shell 142 and drains from the connection 162 for passage to and through line 52 of the fluid circuit, as previously mentioned in connection with FIG. 1.

As also shown in FIG. 1, the pressure reducing station 14 includes four flow lines 166, 168, 170 and 172, connected in parallel having valves 174, 176, 178 and 180, connected therein, to selectively reduce the fluid pressure to the separating station 16 during initial start up.

As shown in FIG. 2, the flow line 166 is in the form of a conduit connected to an outlet header 165 in flow communication with the tubes forming the roof 94, with one end of the conduit registering with a downcomer 182.

Figure 5:
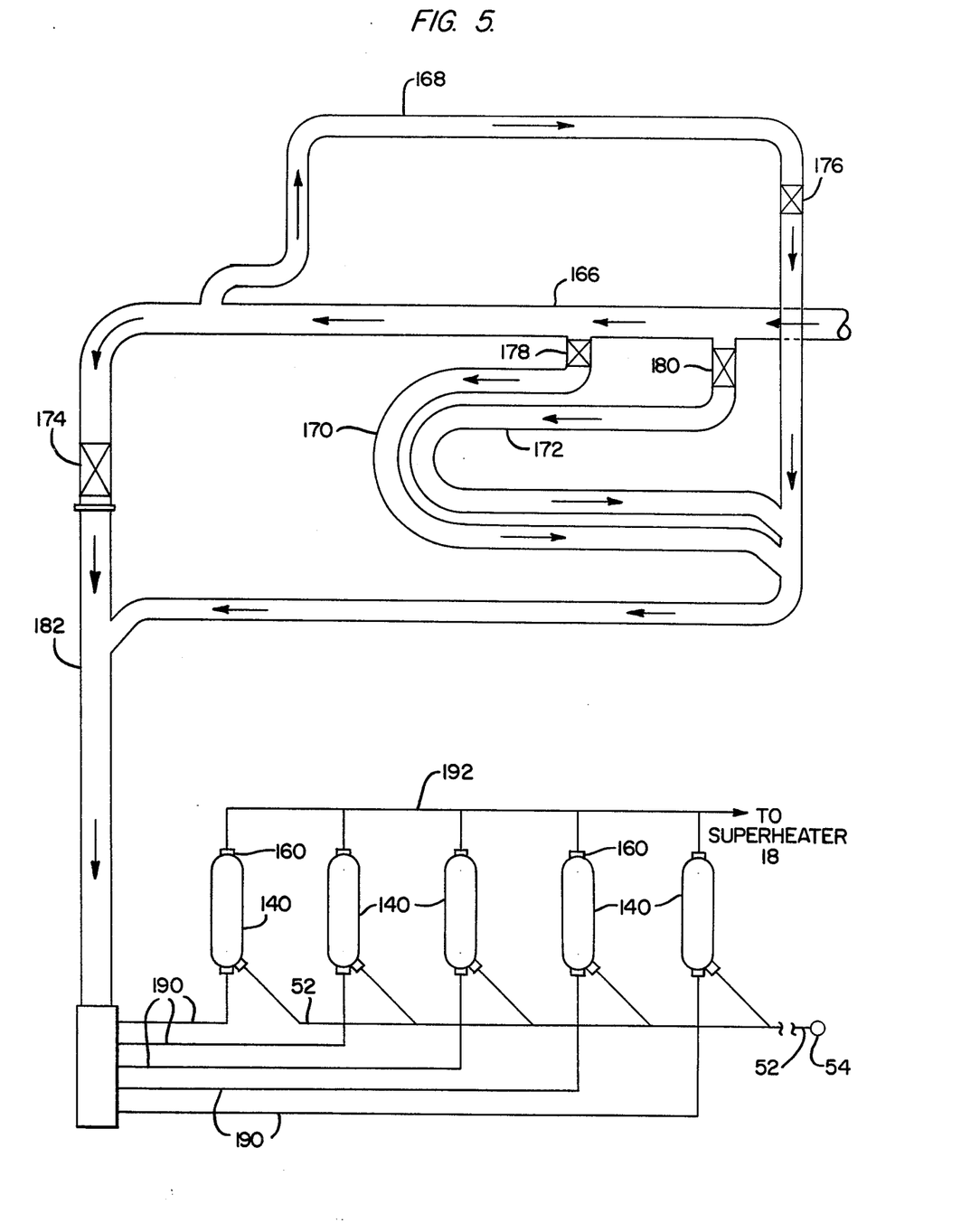
FIG. 5 depicts the flow circuit included in the pressure reducing station of the system of the present invention.

The specific arrangement of the conduit 166 along with the details of the other components of the pressure reducing station 14 are shown in FIG. 5. In particular, the flow line 168 is in the form of a bypass conduit connected to the conduit 166 and to the downcomer 182. Each of the flow lines 170 and 172 is in the form of relatively small bore tube with a high friction pressure drop when compared to the other flow conduits of the system. Each of the tubes 170 and 172 connects the conduit 166 with the conduit 168 and functions to increase the pressure drop across the pressure reducing station as the temperature and flow of the fluid increase during start-up. It is noted from the foregoing that the conduits 166 and 168 and the tubes 170 and 172 are, in effect, connected in parallel with their equivalent parallel connections being shown in FIG. 1.

The valve 174, 178 and 180 associated with the conduit 166 and the flow tubes 170 and 172, respectively, are in the form of on-off valves for selectively permitting fluid flow through the latter lines or shutting off flow in the event the system goes off line or must be shut down for cleaning or the like. The valve 176 associated with the conduit 168 is a throttling valve which can be moved from a normally closed position during start up to a wide open position during normal operation to gradually control the fluid pressure in the furnace. It is understood that each of the valves 176 and 174 can be operated automatically in a conventional manner in response to furnace pressure and postion of valve 176 respectively, which sequence will be described later.

A plurality of conduits 190 connect the downcomer 182 to the end portions 144a of the risers 144 of a plurality of separators 140. It is understood that several of the separators 140 have been omitted from the drawings in the interest of brevity. Although also not shown in the drawings, it is also understood that another flow circuit identical to the one just described, connects the downcomer 182 to another series of separators 140.

The vapor outlets 160 of the separators 140 are connected to an inlet header 192 for the primary superheater 18 as shown in FIG. 2 for supplying the vapor from the separators to the superheater. As previously discussed, the water outlets 162 of the separators 140 are connected, via a line 52 to the drain collecting header 54.

The basic operation of the system of the present invention is better described with reference to FIGS. 6–10 which are similar to FIG. 1 but show by means of relatively heavy lines and shading of the various components, the actual flow paths through the circuitry of the system during various operational stages. In particular, and with reference to FIG. 6, the system is initially flushed by actuating the feedwater pump 42 and opening the valves 178 and 180 to establish a feedwater pumping rate of approximately 15% of full load which routes the water through the economizer 10, the walls of the furnace section 12, the valves 178 and 180 and the tubes 170 and 172, with the latter functioning to maintain the upstream furnace circuit pressure at a range of 1800–2200 psi. The valves 66 and 68 are closed and the valve 64 opened so that the water draining from the separators 140 passes through the line 52, the header 54, and the valves 56, 58 and 60, to the condenser 30, via the valve 64. In this manner, cycle water clean-up can be accomplished by routing the flow through the demineralizer 34. Since no vapor is generated at this stage, there is no flow through the vapor flow circuit extending from the separators 140.

Figure 6:
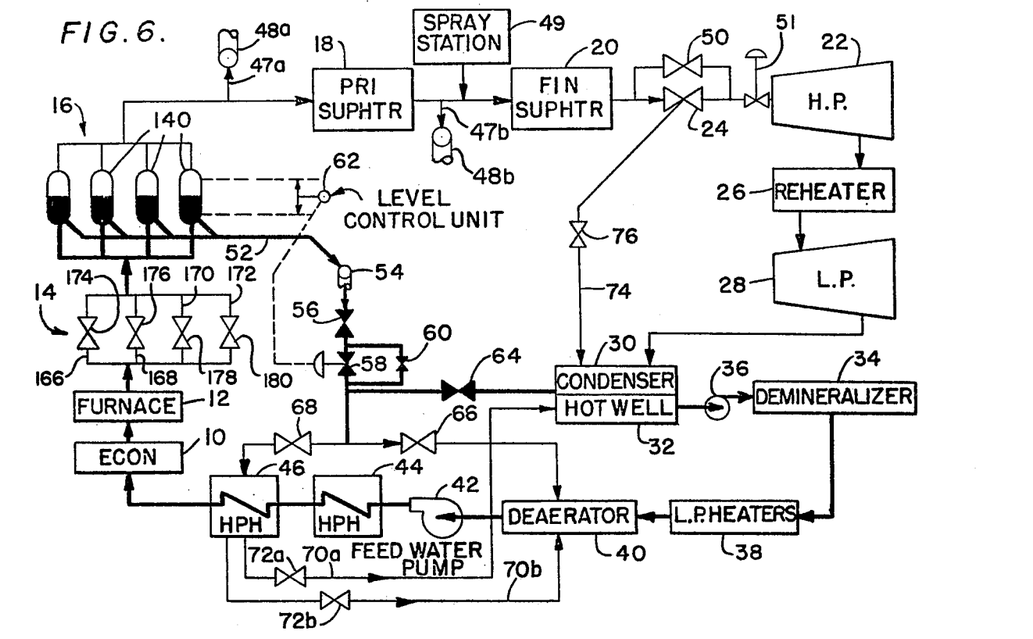
FIGS. 6–10 are a series of schematic diagrams, similar to FIG. 1 and illustrating the various operational modes of the system of the present invention.

Control valves 58 and 60 will maintain normal water level in separators 140 in response to level control unit 62.

Figure 7:
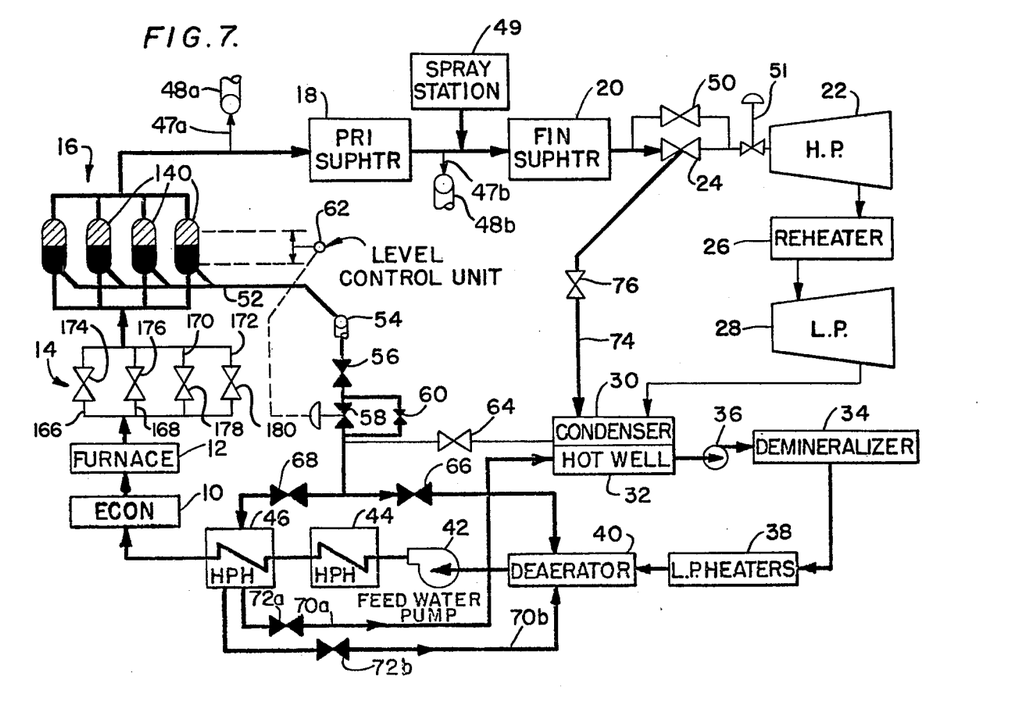

With reference to FIG. 7, the burners 104 and 106 are lit at approximately 10–15% of their full load firing rate and the temperature of the fluid entering the pressure reducing station 14 is raised over a period of time to approximately 450°. The feedwater pumping rate is increased to 25% which causes the valve 176 to open as necessary to control the outlet pressure from the furnace 12 to approximately 3500 psi. The valve 64 is closed and the valves 66 and 68 are opened so that drain water from the separators 140 is routed through the line 52, the header 54, and to the deaerator 40 and the high pressure heater 46 under control of the valves 66 and 68, respectively. The steam separated in the separators 140 as a result of the above-mentioned increased temperature is routed directly to and through the superheaters 18 and 20 and to the turbine stop valve 24 where it drains, through the line 74, into the condenser 30.

Figure 8:
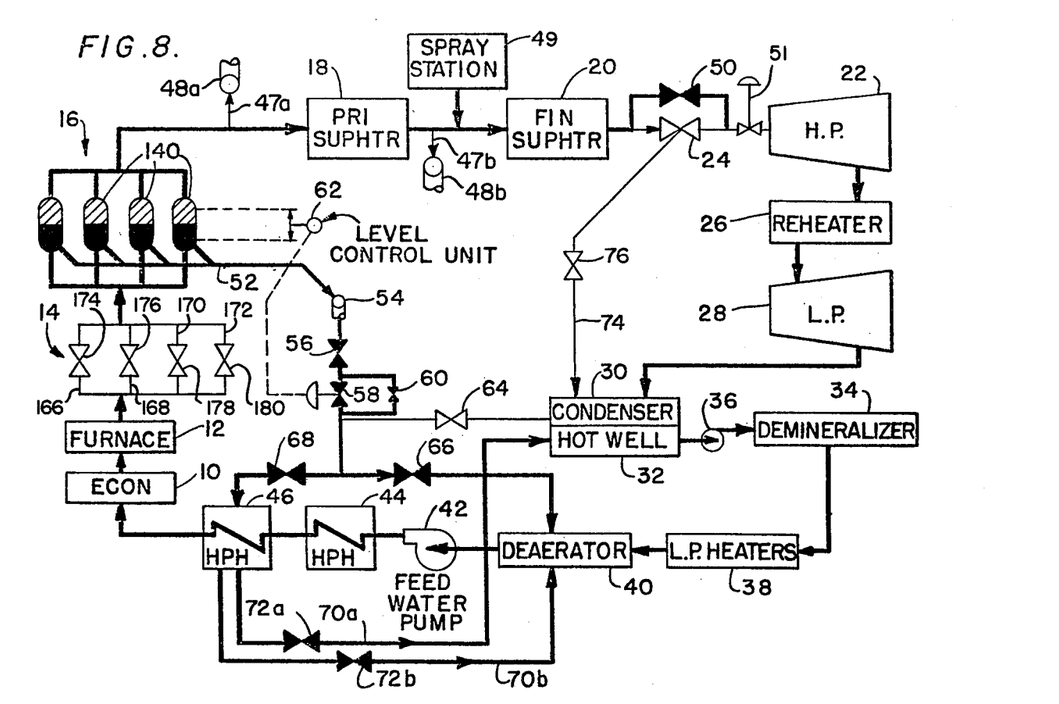

Referring to FIG. 8, valve 76 is closed, throttle pressure is then raised to 1000 psi. by increasing the firing rate of the burners 104 and 106, the turbine bypass valve 50 is opened to direct steam into the high pressure turbine 22. The turbine is then brought up to speed, synchronized and initially loaded. The load is then increased to 7% of full load at the 1000 psi. throttle pressure, with the spray station 49 controlling the final steam temperature to turbine 22. In this mode, the water flow from the separators 140 is identical to that discussed in the previous mode.

Figure 9:
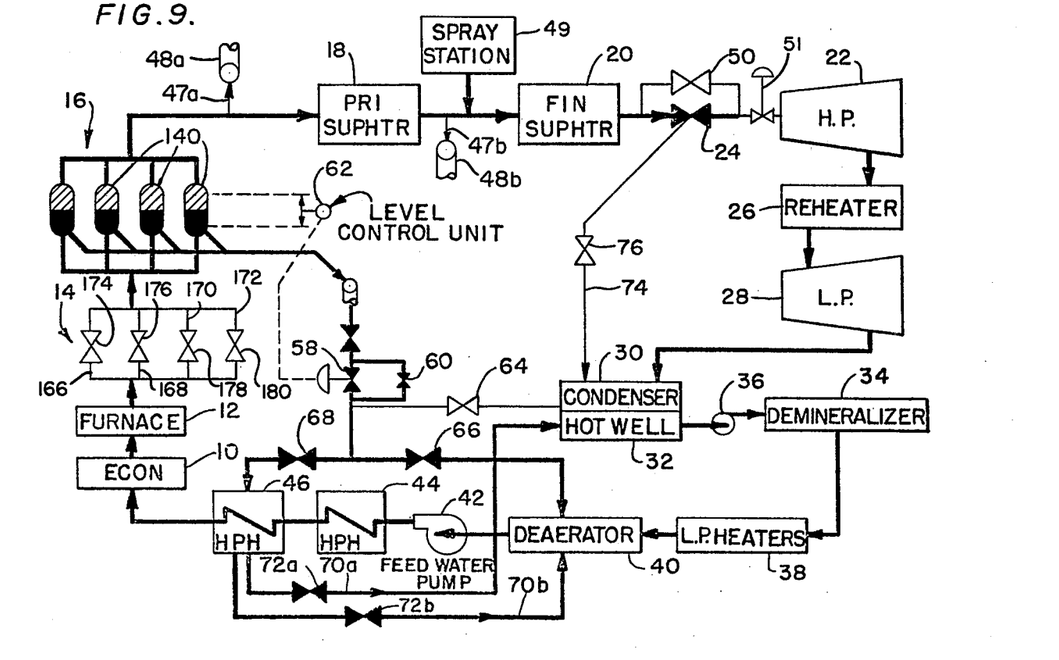

The turbine load is then increased to 25% of full load with the turbine control valve 51 approximately 25% open by increasing throttle pressure from 1000 psi. to 3500 psi. by firing rate control to achieved the operation shown in FIG. 9. In this mode, the turbine bypass valve 50 is shut off and the steam flow is through the turbine stop valve 24.

As separator pressure approaches 3000 psi. a separator pressure error override modifies the level control unit 62 signal to control valves 58 and 60 when low level is indicated. In this manner proper operation of valves 58 and 60 is assured even as the level control signal becomes erratic in the 3000 psi. to 3550 psi. range.

Figure 10:
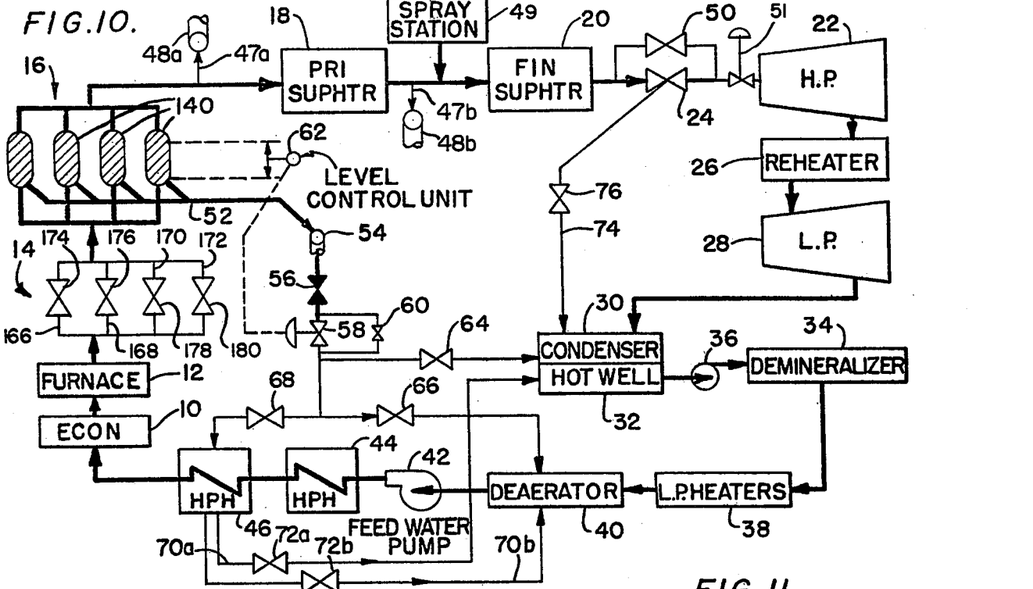

As the load approaches 25%, the larger control valve 58 closes with later sequential closing of the small control valve 60. At 25% load both valves 58 and 60 are closed removing the bypass water drain circuit, including line 52 from service, as shown in FIG. 10. As the turbine load is increased above 25%, valve 174 at the pressure reducing station 14 is opened in response to a permissive signal generated when valve 176 is greater than a predetermined percent open position and vapor at full pressure from the furnace section 12 passes through the pressure reducing station, the separators 140, the superheaters 18 and 20 and to the high pressure turbine 22, with the spray station 49 in service for transient control of final steam temperature.

It is thus noted that when the small bore tubes 170 and 172 are in service, furnace pressure will vary between approximately 1800 psi. and 2200 psi. with the valves 174 and 176 fully closed, and that when the fluid flow is increased from 15% to 25% of full load flow as described above, the valve 176 will open as necessary to control upstream furnace pressure to 3550 psi. Also, the valve 174 will open when 25% turbine load is achieved at 3550 psi. throttle pressure.

Figure 11:
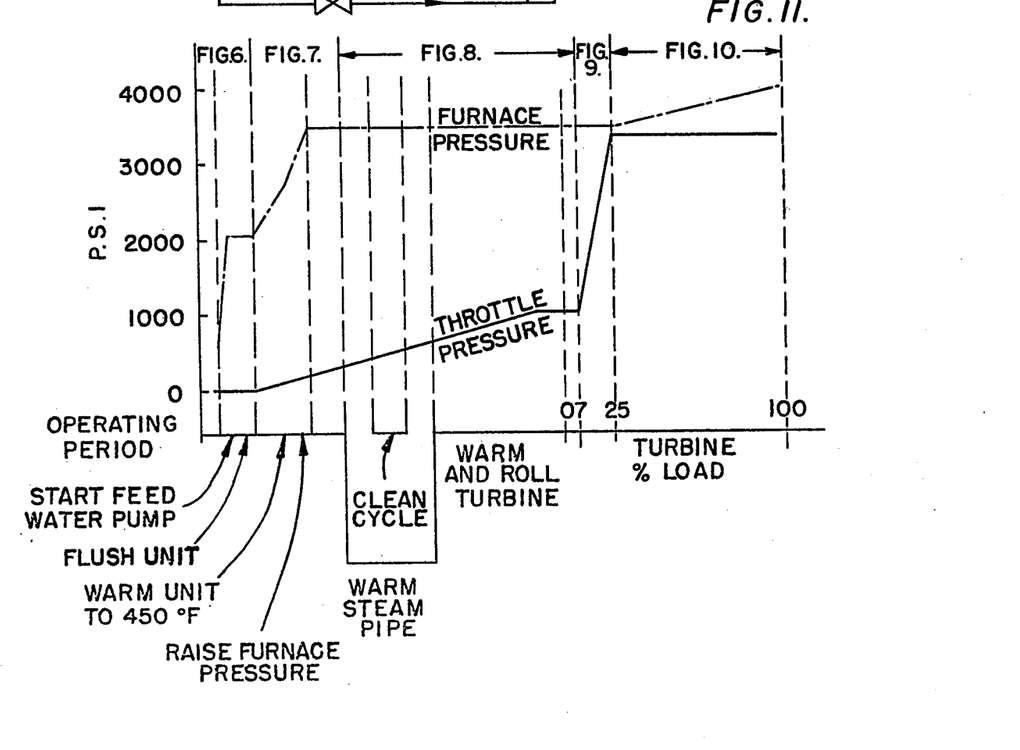
FIG. 11 is a pair of operational curves derived in accordance with the system of the present invention.

FIG. 11 depicts the variations of furnace pressure and the throttle pressure to the superheaters and high pressure turbines throughout the above-mentioned stages of operation and summarizes the pressure variances discussed in connection with FIGS. 6–10.

It is thus seen that the system and method of the present invention enables a quick and efficient start-up to be achieved with a minimum of control functions. For example, the use of the small bore tubes 170 and 172 function to control the pressure of the cold fluid during start-up without the need for costly valves and without requiring the use and resultant excessive wear of the valves 174 and 176. Also, since the level in the separators 140 in the arrangement of the present invention determines the division point between water and steam circuits during start-up, the system and method of the present invention enables the turbines to be smoothly loaded at optimum pressures and temperatures that can be constantly and gradually increased, without the need of boiler division valves or external bypass circuitry for steam dumping. Also, according to the system and method of the present invention, operation can be continuous at very low loads with a minimum of heat loss to the condenser. Still further, it can be appreciated that the system and method of the present invention can operate in a cyclic mode, such as, for example, reduction to house load daily and/or weekly shut-downs and restarts.

It is understood that several variations in the foregoing can be made without departing from the scope of the invention. For example, the number of tubes similar to tubes 170 and 172 and the number of conduits similar to conduits 166 and 168 in the pressure reducing station 14 can be increased as necessary to control the fluid pressure in the furnace 12.

It is also understood that other variations of the specific construction and arrangement of the system and method disclosed above can be made by those skilled in the art without departing from the invention as defined in the appended claims.

What is claimed is:

1. A vapor generating system for use in a power plant having a steam turbine and a condenser connected in a series flow relationship; said system comprising a vapor generating section for receiving a heat exchange fluid and applying heat to said fluid; a superheating section for applying additional heat to said fluid; fluid flow circuitry directly connecting said vapor generating section to said superheating section; a pressure control section connected directly in said fluid flow circuitry in a series flow relation with said vapor generating section and said superheating section for receiving said fluid from said vapor generating section and controlling the pressure of said fluid; and separation means connected directly in said fluid flow circuitry between said pressure control section and said superheating section in a series flow relation therewith for separating said fluid into a liquid and a vapor and passing the vapor to said superheating section; said pressure control section including a plurality of conduits connected in a parallel fluid flow relationship, at least one of said conduits adapted to receive fluid from said furnace section during start-up and full load operation of said vapor generating section, and valve means disposed in at least one of said other conduits for selectively controlling the fluid pressure in said furnace after a predetermined amount of heat has been added to said fluid; said separation means comprising a plurality of separators connected in a parallel relationship and adapted to receive fluid from said conduits during start-up and full load operation of said vapor generating section.

2. The system of claim 1, wherein said valve means is adapted to vary the flow of said fluid through said other conduit to maintain substantially constant pressure in said vapor generating section during full load operation.

3. The system of claim 2, wherein there are a plurality of said other conduits, the valve means disposed in one of said other conduits being adapted to open when the valve means in another of said other conduits attains a predetermined position.

4. The system of claim 1, further comprising an steam header, a flow line connecting said steam header to said fluid flow circuitry and valve means associated with said flow line to control the flow of steam from said fluid flow circuitry to said header.

5. The system of claim 1, wherein said separation means comprises a plurality of separators connected in a parallel relationship, and further comprising means for controlling the liquid level in each of said separators.

6. The system of claim 1, further comprising liquid circuit means connecting said condenser to said vapor generating section, and at least one heating means and at least one deaerator connected in said liquid circuit means in a series flow relationship between said condenser and said vapor generating section, the condensed vapor from said condenser being passed in said liquid circuit means through said heating means and said deaerator and to said vapor generating section.

7. The system of claim 6, further comprising means for passing said liquid from said separation means directly to said heating means.

8. The system of claim 7, further comprising means for passing said liquid from said separation means directly to said deaerator.

9. The system of claim 1, wherein said one conduit is in the form of a small bore tube having a diameter less than that of said other conduit.

* * * * *